United States Patent [19]

Paul et al.

[11] Patent Number: 4,794,141

[45] Date of Patent: Dec. 27, 1988

[54] THERMOPLASTIC MOULDING COMPOSITIONS BASED ON POLYSILOXANE/POLYCARBONATE BLOCK COPOLYMERS

[75] Inventors: Winfried Paul, Krefeld; Ulrich Grigo, Kempen; Peter R. Müller, Leverkusen; Werner Nouvertné, Krefeld, all of Fed. Rep. of Germany

[73] Assignee: Bayer Aktiengesellschaft, Bayerwerk, Fed. Rep. of Germany

[21] Appl. No.: 940,874

[22] Filed: Dec. 10, 1986

Related U.S. Application Data

[63] Continuation-in-part of Ser. No. 828,471, Feb. 12, 1986, abandoned.

[30] Foreign Application Priority Data

Feb. 26, 1985 [DE] Fed. Rep. of Germany ....... 3506680

[51] Int. Cl.[4] .............................................. C08L 53/00
[52] U.S. Cl. ....................................... 525/92; 525/100; 525/101
[58] Field of Search .......................... 525/92, 101, 100

[56] References Cited

U.S. PATENT DOCUMENTS

| | | |
|---|---|---|
| 2,999,846 | 9/1961 | Schnell et al. ................. 528/171 |
| 3,271,367 | 9/1966 | Schnell et al. ................. 528/171 |
| 3,419,634 | 12/1968 | Vanghn ............................ 528/29 |
| 3,525,712 | 8/1970 | Kramer ............................ 528/198 |
| 3,544,514 | 12/1970 | Schnell et al. ................. 528/198 |
| 3,879,347 | 4/1975 | Serini et al. .................... 528/125 |
| 3,879,348 | 4/1975 | Serini et al. .................... 528/196 |
| 4,161,469 | 7/1979 | Legrand et al. ................ 525/439 |
| 4,161,498 | 7/1979 | Bopp ............................... 525/439 |
| 4,569,970 | 2/1986 | Paul et al. ....................... 525/92 |

FOREIGN PATENT DOCUMENTS 1173998 9/1984 Canada.
3506472 2/1985 Fed. Rep. of Germany.

OTHER PUBLICATIONS

Chemistry and Physics of Polycarbonates by H. Schnell, Interscience Publishers, 1964,-p. 41.

*Primary Examiner*—John C. Bleutge
*Assistant Examiner*—Ralph H. Dean, Jr.
*Attorney, Agent, or Firm*—Gene Harsh; Joseph C. Gil; Aron Preis

[57] ABSTRACT

The present invention relates to thermoplastic moulding compositions containing polydiorganosiloxane/polycarbonate block copolymers, elastomeric polymers and, if appropriate, polyalkylene terephthalates.

8 Claims, No Drawings

THERMOPLASTIC MOULDING COMPOSITIONS BASED ON POLYSILOXANE/POLYCARBONATE BLOCK COPOLYMERS

CROSS-REFERENCE TO RELATED APPLICATION

The present application is a continuation-in-part of U.S. application Ser. No. 828,471, filed on Feb. 12, 1986, now abandoned.

The present invention relates to thermoplastic moulding compositions containing (A) 30 to 98, preferably 40 to 90, parts by weight of a polydiroganosiloxane/polycarbonate block copolymer with average molecular weights $\overline{M}w$ of 10,000 to 30,000, preferably 15,000 to 25,000 ($\overline{M}w$ determined in a known manner by ultracentrifugation or measurement of scattered light) and with a content of poly(diorganosiloxane) structural units of between 10% by weight and 0.5% by weight, preferably between 7% by weight and 1% by weight, in each case based on the total weight of the block copolymer, the block copolymers being prepared starting from polydiorganosiloxanes which contain α,ω-bis-hydroxyaryloxy end groups and have a degree of polymerisation $\overline{P}n$ of between 5 and 100, preferably between 20 and 80, chain stoppers also being used, (B) 1 to 30, preferably 5 to 20, parts by weight of an elastomeric polymer with a glass transition temperature of less than $-20°$ C. and (C) 0 to 50 parts by weight of a thermoplastic polyalkylene terephthalate, the total of parts by weight of components (A)+(B)+(C) in each case being 100 parts by weight, which are characterised in that component (A) is prepared by the phase boundary process using monoalkylphenols or dialkylphenols with a total of 8 to 20C atoms in the alkyl substituents, preferably phenols of the formula (III), as chain stoppers

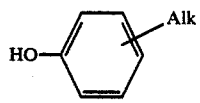

(III)

wherein

Alk represents a linear or branched alkyl radical with 8 to 15 C atoms.

The polydiorganosiloxane/polycarbonate block copolymers of component (A) and their preparation are the subject of German patent application No. P 3506472.2 which has been filed by the Applicant Company, and from which the following statements have been taken:

According to German patent application No. P 3506472.2 corresponding to U.S. Pat. No. 4,732,949, thermoplastic poly(diorganosiloxane)/polycarbonate blocks copolymers with average molecular weights Mw (weight-average) of about 10,000 to 30,000, preferably about 15,000 to 25,000 (determined in a known manner by ultracentrifugation or measurement of scattered light) and with a content of poly(diorganosiloxane) structural units of between 10% by weight and 0.5% by weight, preferably between 7% by weight and 1% by weight, in each case based on the total weight of the block copolymer, the poly(diorganosiloxane) structures having a degree of polymerisation of between 5 and 100, preferably between 20 and 80, are prepared from (a) α,ω-bis-hydroxyaryloxy-polydiorganosiloxanes with degrees of polymerisatinn of between 5 and 100, preferably between 20 and 80, preferably those of the formula (I), (b) other diphenols, preferably of the formula (II), (c) chain stoppers and, if appropriate, (d) branching agents, with phosgene by the known methods of the two-phase boundary process, monoalkylphenols or di-alkylphenols with a total of 8 to 20C atoms in the alkyl substituents, preferably those of the formula (III)

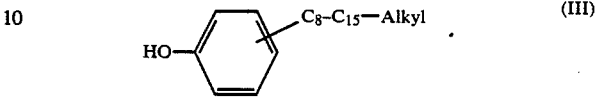

(III)

being employed as chain stoppers in sufficient amounts, preferably in amounts of 1.0 mol % to 10 mol %, based on the diphenols employed as component (b), reaction of the phenolic components being quantitative.

This German patent application No. P 3506472.2 corresponding to U.S. Pat. No. 4,732,949 also relates to the block copolymers which have monoalkyphenyl or dialkylphenyl end groups and are obtainable by this process.

These products have improved mould release properties and flow properties and a tough/brittle transition which is shifted towards lower temperatures.

α,ω-Bishydroxy-aryloxy-polydiorganosiloxanes of component a) to be employed according to this German patent application No. P 3506472.2 are known, for example, from U.S. Pat. No. 3,419,634.

Polydiorganosiloxanes which contain α,ω-bis-hydroxy-aryloxy end groups and are preferably to be employed are those of the formula (I)

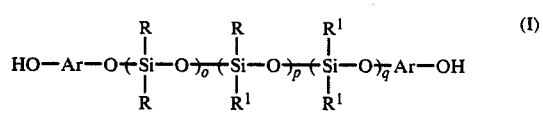

(I)

wherein the radicals Ar are identical or different arylene radicals from diphenols with preferably 6 to 30C. atoms, R and $R^1$ are identical or different and denote linear alkyl, branched alkyl, halogenated linear alkyl, halogenated branched alkyl, aryl or halogenated aryl, but preferably methyl, and the number of diorganosiloxy units $n=o+p+q=5$ to 100, preferably 20 to 80.

Alkyl in the above formula (I) is, for example $C_1$–$C_{20}$-alkyl; aryl in the above formula (I) is $C_6$–$C_{14}$-aryl. In the above formula I, halogenated denotes partly or completely chlorinated, brominated or fluorinated. Examples of alkyl, aryl, halogenated alkyl and halogenated aryl radicals are methyl, ethyl, propyl, n-butyl, tert.-butyl, phenyl, naphthyl, chloromethyl and trifluoropropyl.

Diphenols which are to be employed for the preparation of the α,ω-bis-hydroxy-aryloxypolydiorganosiloxanes of component (a), preferably of the formula (I), to be used according to the invention are: hydroquinone, resorcinol, dihydroxydiphenyls, bis-(hydroxyphenyl)-alkanes, bis(hydroxyphenyl)-cycloalkanes, bis-(hydroxyphenyl) sulphides, bis-(hydroxyphenyl) ethers, bis-(hydroxyphenyl) sulphoxides, bis-(hydroxyphenyl) sulphones and α,α-bis-(hydroxyphenyl)diisopropylbenzenes, and nuclear-alkylated and nuclear-halogenated compounds thereof. These and other suitable aromatic dihydroxy compounds are listed, for example, in U.S. Pat. Nos. 3,271,367 and 2,999,846 and in German Offenlegungsschriften (German Published Specification) Nos. 2,063,050 and 2,211,957.

Diphenols which are preferably suitable for the preparation of the α,ω-bishydroxy-aryloxy-diorganosiloxanes of component (a) are those of the formula (II)

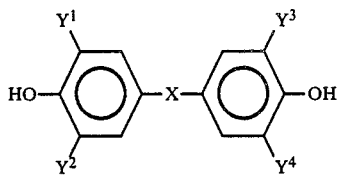

wherein
X denotes a single bond, —CH$_2$—,

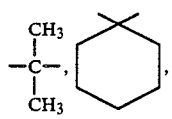

O, S, SO$_2$ or

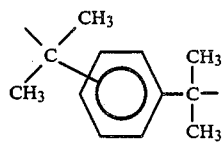

and
$Y^1$ to $Y^4$ are identical or different and denote hydrogen, C$_1$–C$_4$-alkyl preferably methyl, or halogen, preferably chlorine or bromine.

Examples of preferred diphenols are 2,2-bis-(4-hydroxyphenyl)-propane, 1,1-bis-(4-hydroxyphenyl)-cyclohexane, 2,2-bis-(3,5-dichloro-4-hydroxyphenyl)-propane, 2,2-bis-(3,5-dibromo-4-hydroxyphenyl)-propane, 2,2-bis(3,5-dimethyl-4-hydroxyphenyl)-propane, bis-(3,5 and bis-(4-hydroxyphenyl) sulphide.

Other diphenols of component (b) which can be employed according to German patent application No. P 3506472.2 are those mentioned as preferred again corresponding to the formula (II).

Monoalkylphenols and dialkylphenols which are suitable according to German patent application No. P 3506472.2 can contain linear alkyl radicals and branched alkyl radicals. Examples of the chain stoppers of component (c) which can be used according to the invention are p-isooctylphenol, p-nonylphenol, 3,5-di-tert.-butyl-phenol, p-tert.-octylphenol, p-dodecyl-phenol, 2-(3,5-dimethylheptyl)-phenol and 4-(3,5-dimethyl-heptyl)-phenol.

Instead of the monoalkylphenols or dialkylphenols, halogenocarbonic acid esters thereof can also be employed.

Branching agents of component (d) which can be employed are those with three or more than three functional groups, in particular those with three or more than three phenolic hydroxyl groups, and the customarily known amounts of branching agents of between 0.05 and 2 mol %, based on the diphenols of component (b), are to be observed. The preparation of branched polycarbonates is described, for example, in DT-OS (German Published Specification) No. 1,570,533 and DT-OS (German Published Specification) No. 1,595,762 and in U.S. Pat. No. 3,544,514.

Examples of some of the compounds which have three or more than three phenolic hydroxyl groups and which can be used are 2,4-bis-(4-hydroxyphenyl-isopropyl)-phenol, 2,6-bis-(2'-hydroxy-5'-methyl-benzyl)-4-methylphenol, 2-(4- hydroxyphenyl)-2-(2,4-dihydroxyphenyl)-propane and 1,4-bis-(4,4'-dihydroxytriphenyl-methyl)-benzene. Some of the other trifunctional compounds are 2,4-dihydroxybenzoic acid, trimesic acid, cyanuric chloride and 3,3-bis-(4-hydroxyphenyl)-2-oxo-2,3-dihydroindole, as well as 3,3-bis-(4-hydroxy-3-methyl-phenyl)-2-oxo-2,3-dihydroindole.

The polydiorganosiloxanes containing α,ω-bis-hydroxyaryloxy end groups and the chain stoppers can be added in the two-phase boundary process together with the other diphenols of component (b) before the introduction of phosgene, or separately during or after the introduction of phosgene, but in each case before the addition of the polycondensation catalyst.

Suitable organic solvents for the two-phase boundary process are those known for thermoplastic polycarbonates, such as, for example, methylene chloride or chlorobenzene. benzene.

Suitable basic compounds for the formation of the aqueous alkaline phase are solutions of LiOH, NaOH, KOH, Ca(OH)$_2$ and/or Ba(OH)$_2$ in water.

Suitable catalysts for the polycondensation by the two-phase boundary process are the tertiary aliphatic amine catalysts known for polycarbonate synthesis, such as trimethylamine, triethylamine, n-tripropylamine, n-tributylamine or N-ethylpiperidine; if appropriate, the known quaternary ammonium salts, such as, for example, tetrabutylammonium bromide, can also be employed.

The amount of catalyst for the two-phase boundary process varies between 0.2 and 5 mol %, depending on the diphenol employed, and between 5 and 10 mol % if tetramethyl-substituted diphenols are employed, in each case based on the total amount of diphenols of component (b) employed.

The amounts of organic phase are preferably chosen so that the two-phase boundary polycondensation is carried out with a 5 to 20% strength organic solution, preferably 10 to 15% strength organic solution.

In the preparation by the two-phase boundary process, the amounts of aqueous-alkaline phase in terms of volume are preferably the same as the amount of the total organic phase. It can also be greater or smaller in volume than the total amounts of the organic phase.

The pH value of the aqueous phase during the reaction is between pH 9 and 14, preferably between pH 12 and 13.

The particular reactant ratios to be employed between the other diphenol of component (b) and the polydiorganosiloxane of component (a) containing hydroxy-aryloxy end groups depend on the content of poly(diorganosiloxane) units to be achieved in the block copolymers to be prepared according to the invention, reaction of the reactants usually being quantitative.

Carbonic acid halides, in particular carbonic acid chlorides, such as, for example, phosgene, COBr$_2$ or the bischlorocarbonic acid esters of diphenols are used in a known manner in a corresponding amount as a carbonate donor for the preparation by the two-phase boundary process, less than ½ mole of diphenol in each case being used per halogeno-carbonic acid group.

The aromatic thermoplastic block copolymers can be isolated by the method known from the synthesis of polycarbonate by the two-phase boundary process. In this method, the organic phase containing the dissolved copolycarbonate is separated off and washed and the copolycarbonate is then isolated by evaporating the solution, a devolatilisation extruder preferably being used as the final stage of the working up process.

The customary additives can be added to the resulting block copolymers before, during or after their preparation. In this connection there may be mentioned, for example, dyestuffs, pigments, stabilizers against the action of moisture, heat and UV and fillers, such as glass powder, quartz products, graphite, molybdenum sulphide, metal powders and glass fibres.

Example according to German patent application No. P 3506472.2 1

The siloxane content, that is to say the content of dimethylsiloxane units in % by weight, based on the total weight of the block copolymer, was determined by nuclear magnetic resonance spectrometry. The degree of polymerization $\bar{n}$ obtained by determination of the end groups on the polysiloxane starting material is given as the average siloxane block length.

The relative solution viscosity was measured at 25° C. at a concentration of 5 g/l in methylene chloride.

The Izod notched impact strength was determined on test pieces 3.2 mm and 6.4 mm wide in accordance with the method of ASTM D 256.

The heat distortion point was determined by the Vicat method (VST/B/120) in accordance with DIN 53 460/ ISO 368.

The mould release force was determined on a shell mould.

1. Preparation of a polydimethylsiloxane with bisphenol A end groups 19.2 parts by weight of bisphenol A and 1,800 parts by weight of chlorobenzene are introduced into a vessel provided with a condenser, thermometer, dropping funnel and stirrer. The mixture is warmed to 100° C. and 11.6 parts by weight of potassium carbonate are added. Thereafter, a solution of 178 parts by weight of $\alpha,\omega$-bisacetoxypolydimethylsiloxane, $\bar{P}_n=84$, in 178 parts by weight of chlorobenzene is added to the mixture under reflux over a period of 15 minutes, stirring being continued for a further two hours. The mixture is cooled to about 80° C. and filtered while still hot.

2. Preparation of a polydimethylsiloxane/polyarbonate block copolymer 3,035 parts by weight of bisphenol A, 3,024 parts by weight of sodium hydroxide, 34,700 parts by weight of water, 17,800 parts by weight of methylene chloride, 13,100 parts by weight of chlorobenzene and 164.7 parts by weight of 4-(1,1,3,3-tetramethylbutyl)-phenol are added to the solution, described under 1, of a polydimethylsiloxane with bisphenol A end groups in a reaction flask equipped with a stirrer, phosgene inlet tube, reflux condenser, internal thermometer and dropping funnel. 2,216 parts by weight of phosgene are passed in at room temperature, the pH being kept between 12 and 13 by addition of 45% strength sodium hydroxide solution. Introduction of the phosgene takes about one hour. Thereafter, 11 parts by weight of triethylamine are added and the mixture is subsequently stirred at pH 12 to 13 for a further 45 minutes. The cocondensate is worked up by methods customeray for polycarbonate.

| Properties | Example |
| --- | --- |
| relative solution viscosity | 1.200 |
| siloxane content (%) | 5.3 |
| siloxane block length (n) | 84 |
| melt viscosity at 300° C./$10^3$ s$^{-1}$ Pa.s | 113 |
| Izod notched impact strength (3.2 mm) | |
| room temperature J/m | 557* (*tough fracture) |
| −40° C. J/m | 381* |
| critical temperature °C. | less than −40 |
| Izod notched impact strength (6.4 mm) | |
| room temperature J/m | 391* |
| 0° C. J/m | 7 × 355*/3 × 320 |
| critical temperature °C. | 0 |
| Vicat heat distortion point (VST/B/120) °C. | 141 |
| Mould release force at 136° C. mould temperature/ 300° C. material temperature bar | 5 |

Component (A) can also consist of a mixture of polydiorganosiloxane/polycarbonate block copolymers with other polysiloxane-free thermoplastic polycarbonates, the weight-average molecular weights $\overline{M}w$ of which are in each case again from 10,000 to 30,000, preferably 15,000 to 25,000 ($\overline{M}w$ determined in a known manner by ultracentrifugation or measurement of scattered light), the content of polydiorganosiloxane structural units in the polycarbonate mixture again being between 10% by weight and 0.5% by weight, preferably between 7% by weight and 1% by weight, in each case based on the total weight of the polycarbonate mixture, and all the polycarbonates of the mixture again having monoalkylphenyl or dialkylphenyl end groups with a total of 8 to 20C atoms in the alkyl substituents, preferably monoalkylphenyl end groups of the formula (IIIa)

(IIIa)

wherein

Alk is a linear or branched alkyl radical with 8 to 15C atoms.

Polydiorganosiloxane/polycarbonate block copolymers which are suitable for the preparation of such polycarbonate mixtures are also those with a content of poly(diorganosiloxane) structural units of more than 10% by weight, preferably 40% by weight to 60% by weight, and an $\overline{M}w$ which can be between 15,000 and 60,000.

Such polydiorganosiloxane/polycarbonate block copolymers can be prepared by a process analogous to the preparation of those block copolymers containing 10% by weight to 0.5% by weight of poly(diorganosiloxane) structural units in accordance with the abovementioned German patent application No. P 3506472.2 which has been filed by the Applicant Company.

The elastomeric polymers (B) include copolymers—in particular graft copolymers—with elastomeric properties, which are essentially obtainable from at least two of the following monomers: chloroprene, butadiene, isoprene, isobutene, styrene, acrylonitrile, ethylene, propylene, vinyl acetate, (meth)acrylic acid esters with 1 to 18C atoms in the alcohol component and carbon monoxide, that is to say polymers such as are described, for example, in "Methoden der organischen Chemie" ("Methods of Organic Chemistry"), (Houben-Weyl), Volume 14/1, Georg Thieme Verlag, Stuttgart 1961, pages 393–406, and in C. B. Bucknall, "Toughened Plastics", Appl. Science Publishers, London 1977. Preferred polymers of component (B) have a gel content of more than 20% by weight, preferably more than 40% by weight.

Preferred polymers of component (B) are ethylene/vinyl acetate copolymers with 15–70% by weight of vinyl acetate and melt indices from non-flowing to 1,000, preferably 0.1–20, measured at 190° C. and under a load of 2.16 kp in accordance with the method of DIN 53 753. Terpolymers of ethylene, acrylic acid alkyl esters or vinyl acetate and carbon monoxide are also preferred.

The preferred polymers mentioned of component (B) are, for example, the so-called EPM and EPDM rubbers in which the weight ratio of ethylene radicals to propylene radicals is in the range from 40:60 to 90:10, preferably 40:60 to 65:35.

The Mooney viscosities (minutes running time 1+4/100° C. according to DIN 53 523) of the non-crosslinked EPM and EPDM rubbers is between 25 and 100 Mooney units, preferably between 35 and 90 Mooney units. The gel contents of the non-crosslinked EPM and EPDM rubbers are less than 1% by weight.

The ethylene/propylene copolymers (EPM) used contain virtually no double bonds, whilst the ethylene/propylene/diene terpolymers (EPDM) can contain 1–20 double bonds/1,000C atoms. Examples which may be mentioned of suitable diene monomers in the EPDM are conjugated dienes, for example isoprene and butadiene, and non-conjugated dienes having 5–25C atoms, for example 1,4-pentadiene, 1,4-hexadiene, 1,5-hexadiene, 2,5-dimethyl-11,5-hexadiene and 1,4-octadiene, cyclic dienes, for example cyclopentadiene, cyclohexadiene, cyclooctadiene and dicyclopentadiene, alkenylnorbornenes, for example 5-ethylidene-2-norbornene, 5-butylidene-2-norbornene, 2-methallyl-5-norbornene and 2-isopropenyl-5-norbornene and tricyclodienes, for example 3-methyltricyclo-(5,2,1,0,2,6)-3,8-decadiene. The non-conjugated dienes hexa-1,5-diene, ethylidenenorbornene or dicyclopentadiene may be mentioned as preferred. The diene content in the EPDM is preferably 0.5 to 10% by weight.

Such EPM and EPDM rubbers are described, for example, in DE-OS (German Published Specification) No. 28 08 709.

Preferred polymers of component (B) are also optionally selectively hydrogenated block copolymers of a vinyl-aromatic monomer X and a conjugated diene Y of the X-Y type or $X(Y-X)_r$ type (where $r=1-5$) or $Y-(X)_s$ type (where $s=3-5$).

These block copolymers can be prepared by known processes. In general, the technology which is used for the preparation of styrene/diene block copolymers and is described in "Encyclopedia of Polymer Science and Technology", Volume 15, Interscience, N.Y. (1971) on pages 508 et seq. can be used for the preparation of the suitable X-Y block copolymers from styrene, α-methylstyrene, vinyltoluene and the like and from conjugated dienes, such as butadiene, isoprene and the like. The selective hydrogenation can be carried out by routes which are known per se and means that the ethylenic double bonds are essentially completely hydrogenated, the aromatic double bonds remaining largely unaffected. Such selectively hydrogenated block polymers are described, for example, in DE-OS (German Published Specification) No. 3,000,282.

Preferred polymers of component (B) are, for example, polybutadienes grafted with styrene and/or acrylonitrile and/or (meth)-acrylic acid esters, butadiene/styrene copolymers and poly(meth)acrylic acid esters, for example copolymers of styrene or alkylstyrene and conjugated dienes (high impact strength polystyrene), that is to say copolymers of the type described in DE-OS (German Published Specification) No. 1,694,173 (=U.S. Pat. No. 3,564,077), polybutadienes grafted with acrylic or methacrylic acid esters, vinyl acetate, acrylonitrile, styrene and/or alkylstyrenes, butadiene/styrene or butadiene/acrylonitrile copolymers, polyisobutenes or polyisoprenes, such as are described, for example, in DE-OS (German Published Specification) No. 2,348,377 (=U.S. Pat. No. 3,919,353).

Examples of particularly preferred polymers of component (B) are graft polymers which are obtainable by a grafting reaction of I. 10–40, preferably 10–35 and in particular 15–25% by weight, based on the grafted product, of at least one (meth)acrylic acid ester and/or a mixture of 10–35, preferably 20–35% by weight, based on the mixture, of acrylonitrile and 65–90, preferably 65–80% by weight, based on the mixture, of styrene on II. 60–90, preferably 65–90 and in particular 75–85% by weight, based on the grafted product, of a butadiene polymer with at least 70% by weight, based on II, of butadiene radicals as the grafting base, wherein, preferably, the gel content of the grafting base II is 70% (measured in toluene), the degree of grafting g is 0.15 to 0.55 and the average particle diameter $d_{50}$ of the graft polymer is 0.2–0.6, preferably 0.3–0.5 μm.

(Meth)acrylic acid esters I are esters of acrylic acid or methacrylic acid and monohydric alcohols with 1–18C atoms.

In addition to butadiene radicals, the grafting base II can contain up to 30% by weight, based on II, of radicals of other ethylenically unsaturated monomers, such as, for example, styrene, acrylonitrile or esters of acrylic or methacrylic acid with 1–4C atoms in the alcohol component (such as methyl acrylate, ethyl acrylate, methyl methacrylate or ethyl methacrylate). The preferred grafting base II consists of pure polybutadiene.

Since the grafting monomers I do not usually graft completely onto the grafting base II during the grafting reaction, according to the invention graft polymers are also understood as meaning those products which, in addition to the actual graft polymers, also contain homopolymers and copolymers of the grafting monomers I employed. Graft polymers in the context of the invention are those which are obtained by grafting polymerisation of vinyl monomers in the presence of a polymer II.

The average particle size $d_{50}$ is the diameter above and below which in each case 50% by weight of the particles lie. It can be determined by means of ultracentrifuge measurements (W. Scholtan, H. Lange, Kolloid. Z. und Z. Polymere 250 (1972), 782–796) or by means of electron microscopy and subsequent particle counting (G. Kämpf, H. Schuster, Angew. Makromolekulare Chemie 1–, (1970), 111–129), or by means of light scattering measurements.

Particularly preferred polymers of component (B) are also, for example, graft polymers of III. 25–98% by weight, based on component (B), of acrylate rubber with a glass transition temperature of less than −20° C., as the grafting base, and IV. 2–75% by weight, based on component (B), of at least one polymerisable ethylenically unsaturated monomer, the homopolymers or copolymers of which formed in the absence of III would have a glass transition temperature above 25° C., as grafting monomers.

The acrylate rubbers III of the polymers of component (B) are preferably polymers of acrylic acid alkyl esters, if appropriate with up to 40% by weight of other polymerisable ethylenically unsaturated monomers. If the acrylate rubbers employed as the grafting base III —as described below—in turn are already grafted products with a diene rubber core, the diene rubber core is not included in the calculation of this percentage. The preferred polymerisable acrylic acid esters include $C_1$–$C_8$-alkyl esters, for example methyl, ethyl, butyl, octyl and 2-ethylhexyl esters, halogenoalkyl esters, preferably halogeno-$C_1$–$C_8$-alkyl esters, such as chloroethyl acrylate, and aromatic esters, such as benzyl acrylate and phenethyl acrylate. They can be employed individually or as a mixture.

The acrylate rubbers III can be non-crosslinked or crosslinked, preferably partially crosslinked.

For crosslinking, monomers with more than one polymerisable double bond can be copolymerised. Preferred examples of crosslinking monomers are esters of unsaturated monocarboxylic acids with 3 to 8C atoms and unsaturated polyols with 2 to 4 OH groups and 2 to 20C atoms, such as, for example, ethylene glycol dimethacrylate, allyl methacrylate; heterocyclic compounds with more than one unsaturated bond such as, for example, trivinyl and triallyl cyanurate and isocyanurate, and tris-acryloyl-s-triazines, in particular triallyl cyanurate; polyfunctional vinyl compounds such as di-and tri-vinylbenzene; and also triallyl phosphate and diallyl phthalate.

Preferred crosslinking monomers are allyl methacrylate, ethylene glycol dimethacrylate, diallyl phthalate and heterocyclic compounds which contain at least three ethylenically unsaturated groups.

Particularly preferred crosslinking monomers are the cyclic monomers triallyl cyanurate, triallyl isocyanurate, trivinyl cyanurate, triacryloylhexahydro-s-triazine and triallylbenzenes.

The amount of crosslinking monomers is preferably 0.02 to 5, in particular 0.05–2% by weight, based on the grafting base III.

In the case of cyclic crosslinking monomers with at least 3 ethylenically unsaturated groups, it is advantageous to limit the amount to 1% by weight of the grafting base III.

Preferred "other" polymerisable ethylenically unsaturated monomers which, in addition to the acrylic acid esters, can optionally be used for the preparation of the grafting base III are, for example, acrylonitrile, styrene, αmethylstyrene, acrylamides, vinyl $C_1$–$C_6$-alkyl ethers, butadiene and isoprene. Preferred acrylate rubbers as the grafting base III are emulsion polymers with a gel content of 60% by weight.

The gel content of the grafting base III is determined at 25° C. in dimethylformamide (M. Hoffmann, H. Krömer, R. Kuhn, Polymeranalytik I und II (Polymer Analysis I and II), Georg Thieme Verlag, Stuttgart 1977).

Acrylate rubbers as the grafting base III can also be products which contain a crosslinked diene rubber of one or more conjugated dienes, such as polybutadiene, or a copolymer of a conjugated diene with an ethylenically unsaturated monomer, such as styrene and/or acrylonitrile, as the core.

The content of the polydiene cores in the grafting base III can be 0.1 to 80, preferably 10–50% by weight, based on III. The shell and core can be non-crosslinked, partly crosslinked or highly crosslinked independently of one another.

Particularly preferred grafting bases III for graft polymers of component (B) based on polyacrylic acid esters are summarised below:
1. acrylic acid ester polymers and copolymers without a diene rubber core and
2. acrylic acid ester polymers and copolymers containing a diene rubber core.

The grafting yield, that is to say the quotient of the amount of monomer IV grafted on and the amount of grafting monomer IV employed, is as a rule 20 to 80% by weight. The determination can be carried out as described by M. Hoffmann, H. Krömer and R. Kuhn, Polymeranalytik (Polymer Analysis), Volume 1, Georg Thieme Verlag, Stuttgart 1977.

Preferred grafting monomers IV are α-methylstyrene, styrene, acrylonitrile, methyl methacrylate or mixtures of these monomers. Preferred grafting monomer mixtures are those of styrene and acrylonitrile in a weight ratio of 90:10 to 50:50.

Such graft polymers of component (B) based on polyacrylic acid esters are described, for example, in DE-AS (German Published Specification) No. 2,444,584 (=U.S. Pat. No. 4,022,748) and in DE-OS (German Published Specification No. 2,726,256 (=U.S. Pat. No. 4,096,202).

Particularly advantageous graft polymers of this type are obtained when 2–20, preferably 2–15% by weight, based on (B), of monomer IV is grafted onto 80–98, preferaby 85–95% by weight, based on (B), of the completely broken latex of III suspended in water, in the absence of suspending agents. The pulverulent graft polymer obtained can then be dried and homogenised with the other components in the desired ratio and under the action of shearing forces so that the average particle size $d_{50}$ of component (B) in the mixture according to the invention is 0.05–3, preferably 0.1–2 and in particular 0.2–1 μm.

The term "in the absence of suspending agents" means the absence of substances which, depending on their nature and amount, could suspend the grafting monomers IV in the aqueous phase. The definition does not exclude the presence of substances which, for example, have a suspending action during the preparation of a grafting base III, and in such cases the coagulating or precipitating agent used to break the latex III must be added in an amount which compensates the suspending effect of the substances employed in the precursor; in other words: it must be ensured that the grafting monomers IV give no (stable) emulsion or dispersion in the aqueous phase.

A graft polymer of component (B) prepared in this manner in the absence of suspending agents, as a constituent of the moulding compositions according to the invention, can be distributed in the other resin components to an exceptionally low particle size, which even survives prolonged processing times at elevated temperature relatively unchanged.

The term "exceptionally low particle size" means that the number, shape and size of the graft polymer particles to be employed essentially still correspond to the number, shape and size of the graft polymer particles introduced into the other molten resin components, even after homogenisation.

It is also possible to use as the grafting base III those acrylate rubbers which are obtained as an aqueous emulsion (latex), the latex particles of which contain 1–20% by weight, preferably 1–10% by weight, based on III, of monomers already grafted on in the aqueous emulsion and of which the homopolymers or copolymers would have glass transition temperatures of >0° C.

Preferred grafted-on monomers of this type are alkyl acrylates, alkyl methacrylates, styrene, acrylonitrile, α-methylstyrene and/or vinyl acetate.

Such grafting bases III are prepared, for example, by emulsion polymerisation or emulsion grafting polymerisation. However, they can also be prepared by preparing an acrylate rubber in solution or bulk and then grafting on the grafting monomers and subsequently converting these rubbers into an aqueous emulsion suitable for the further grafting process.

Suitable grafting bases III for acrylate rubbers of this particular embodiment are thus preferably, in addition to the polymers listed above, also graft polymers, prepared in aqueous emulsion, of acrylic acid ester polymers or copolymers optionally containing a diene rubber core, and ethylenically unsaturated polymerisable monomers.

Polyalkylene terephthalates of component (C) in the context of the invention are reaction products of aromatic dicarboxylic acids or their reactive derivatives (for example dimethyl esters or anhydrides) and aliphatic, cycloaliphatic or arylaliphatic diols and mixtures of these reaction products.

Preferred polyalkylene terephthalates of component (C) can be prepared from terephthalic acid (or their reactive derivatives) and aliphatic or cycloaliphatic diols with 2–10C atoms by known methods (Kunststoff-Handbuch (Plastics Handbook), Volume VIII, page 695 et seq., Carl Hanser Verlag, Munich 1973).

Preferred polyalkylene terephthalates of component (C) contain at least 80, preferably at least 90 mol %, based on the dicarboxylic acid component, of terephthalic acid radicals and at least 80, preferably at least 90 mol based on the diol component, of ethylene glycol and/or butane-1,4-diol radicals.

The preferred polyalkylene terephthalates (C) can contain, in addition to terephthalic acid radicals, up to 20 mol % of radicals of other aromatic dicarboxylic acids with 4–12C atoms or aliphatic dicarboxylic acids with 4–12C atoms, such as, for example, radicals of phthalic acid, isophthalic acid, naphthalene-2,6-dicarboxylic acid, 4,4'-diphenyldicarboxylic acid, succinic acid, adipic acid, sebacic acid, azelaic acid or cyclohexanediacetic acid.

The preferred polyalkylene terephthalates (C) can contain, in addition to ethylene glycol or butane-1,4-diol radicals, up to 20 mol % of other aliphatic diols with 3–12C atoms or cycloaliphatic diols with 3–21C atoms, for example radicals of propane-1,3-diol, 2-ethylpropane-1,3-diol, neopentylglycol,pentane-1,5-diol, hexane-1,6-diol, cyclohexane-1,4-dimethanol, 3-methylpentane-2,4-diol, 2- methylpentane-2,4-diol, 2,2,4-trimethylpentane-1,3- and -1,6-diol, 2-ethylhexane-1,3-diol, 2,2-diethylpropane-1,4-diol, hexane-2,5-diol, 1,4-di-(β-hydroxyethoxy)-benzene, 2,2-bis-4-hydroxyclohexyl)-propane, 2,4-dihydroxy-1,1,3,3-tetramethylcyclobutane, 2,2-bis-(3-β-hydroxyethoxyphenyl)-propane and 2,2-bis-(4-hydroxypropoxyphenyl)-propane (DE-OS (German Published Specification Nos. 2,407,647, 2,407,776 and 2 715 932).

The polyalkylene terephthalates of component (C) can be branched by incorporation of relatively small amounts of trihydric or tetrahydric alcohols or tribasic or tetrabasic carboxylic acids, such as are described, for example, in DE-OS (German Published Specification) No. 1,900,270 and U.S. Pat. No. 3,692,744. Examples of preferred branching agents are trimesic acid, trimellitic acid, trimethylol-ethane and -propane and pentaerythritol. It is advisable to use not more than 1 mol % of the branching agent, based on the acid component.

Polyalkylene terephthalates (C) which have been prepared solely from terephthalic acid and reactive derivatives thereof (for example dialkyl esters thereof) and ethylene glycol and/or butane-1,4-diol, and mixtures of these polyalkylene terephthalates, are particularly preferred.

Preferred polyalkylene terephthalates (C) are also copolyesters prepared from at least two of the above-mentioned alcohol components; particularly preferred copolyesters are poly(ethylene glycol/butane-1,4-diol) terephthalates.

The polyalkylene terephthalates preferably used as component (C) in general have an intrinsic viscosity of 0.4–1.8 dl/g, preferably 0.5–1.5 dl/g and in particular 0.6–1.3 dl/g, in each case measured in phenol/o-dichlorobenzene (1:1 parts by weight) at 25° C.

Mixtures of polycarbonates and polymers are known (see, for example, Japanese Patent Publication No. 18,611/68 (Teijin, Priority 30.06.65), U.S. Pat. Nos. 3,663,471, 3,437,631, 4,299,928 or DE-OS (German Published Specification) No. 3,114,494).

Compared with the pure polycarbonate, such mixtures have improved toughness properties.

Thermoplastic moulding compositions based on polydiorganosiloxane/polycarbonate block copolymers and polyalkylene terephthalates are known; compare, for example, U.S. Pat. Nos. 4,161,469 and 4,161,498. They are said to be distinguished by an improved impact strength and heat distortion point.

Mixtures of siloxane/polycarbonate block copolymers, polyesters of diols with aromatic dicarboxylic acids and rubber-like vinyl polymers which are distinguished by an improved notched impact strength are known from EP-OS (European Published Specification) No. 0,105,388.

The addition of organopolysiloxane-polycarbonate polymers to mixtures of an aromatic polycarbonate and a polystyrene resin as components which improve the impact strength is known according to DE-OS (German Published Specification) No. 2,434,085, the organosiloxane-polycarbonate polymers used being those of U.S. Pat. No. 3,189,662.

Organosiloxane-polycarbonate polymers according to U.S. Pat. No. 3,189,662 differ from the polydiorganosiloxane/polycarbonate block copolymers according to the invention in that they are prepared by phosgenation up to maximum viscosity.

Mixtures of aromatic polyesters, siloxane/polycarbonate block copolymers, polyesters of diols with aromatic dicarboxylic acids and thermoplastic styrene resins or thermoplastic alkyl acrylate resins which are distinguished from the aromatic polyesters by an improved notched impact strength are known from EP-OS (European Published Specification) No. 0,073,067.

Polysiloxane/polycarbonate block copolymers containing adhesives are known from U.S. Pat. No. 4,117,027, copolymers of vinyltoluene and α-methylstyrene, inter alia, being mentioned as adhesives. The preferred molecular weights of these adhesives are between 500 and 2,000; in our opinion, the adhesives of U.S. Pat. No. 4,117,027 are not elastomeric. There should be also mentioned that the polydiorganosiloxane/polycarbonate block copolymers, known in the relevant literature, are characterized by their improved mechanical properties at low temperatures (see for example B. M. Beach, R. P. Kambour and A. R. Schultz J. Polym. Sci., Polym. Lett. Ed. 12, 247 (1974).

Although the moulding compositions mentioned have many positive properties, they do not meet certain particular requirements, such as are imposed, for example, for apparatus components in the engine space of motor vehicles these being a high heat distortion point, freedom from deformation, stability towards petrol, high toughness and at the same time good flow and mould release properties.

Surprisingly, it has now been found that mixtures of a particular polydiorganosiloxane/polycarbonate block copolymer with alkylphenyl end groups and an elastomeric polymer with a glass transition temperature below −20° C. also show a tough/brittle transition which is significantly shifted towards lower tmmperatures, coupled with excellent flow and mould release properties.

If a particularly high stability towards petrol is required while the remainder of the pattern of properties remains the same, addition of polyalkylene terephthalate is indicated.

To further increase the stability of the mixtures according to the invention containing components (A), (B) and, if appropriate, (C) towards petrol, it is also possible for up to 5% by weight, based on the total weight of components (A) and (B) and, if appropriate, (C), of ethylene homopolymers or copolymers to be added. Ethylene copolymers in this context are polyethylenes, the radicals of which consist of up to 30% by weight, in each case based on the ethylene copolymer, of radicals of other copolyS merisable monomers, such as, for example, (meth)-acrylic acid, in addition to the ethylene radicals.

The moulding compositions according to the invention based on components (A), (B) and, if appropriate, (C) can contain the additives customary in polycarbonate chemistry, rubber chemistry and polyester chemistry, such as nucleating agents, stabilisers, fillers, reinforcing substances, dyestuffs and flameproofing agents.

The filled or reinforced moulding compositions based on components (A), (B) and, if appropriate, (C) can contain up to 40% by weight, based on the reinforced moulding composition, of fillers and/or reinforcing substances. Preferred reinforcing substances are glass fibres. Preferred fillers, which may also have a reinforcing action, are glass beads, mica, silicates, quartz, talc, titanium dioxide and wollastonite.

The moulding compositions based on components (A) and (B) and, if appropriate, (C) which have been provided with flameproofing agents can contain flameproofing agents in a concentratoon of in general less than 30% by weight, based on the flameproofed moulding compositions. All the flameproofing agents known for polyester moulding compositions are possible, such as, for example, polyhalogenodiphenyl, polyhalogenodiphenyl ether, polyhalogenophthalic acid and derivatives thereof and polyhalogeno-oligo- and -poly-carbonates, the corresponding bromine compounds being particularly effective. Synergists, such as, for example, antimony trioxide, can furthermore also be used.

The moulding compositions according to the invention based on components (A), (B) and, if appropriate, (C) can be prepared in the customary mixing units, such as mills, kneaders and one- and two-screw extruders. The moulding compositions according to the invention based on components (A), (B) and, if appropriate, (C) can be processed to shaped articles which display exceptionally little deformation even when exposed to heat for a prolonged period. Although in most cases the resin components (A), (B) and (C) are advantageously mixed in a single step, (A), (B) and it can sometimes also be advisable first to leave out one component and only to admix it in at a later point in time.

The thermoplastic moulding compositions according to the invention can be used, for example, for car body components, such as bumpers and side protection components.

EXAMPLES

The components (A), (B) and (C) employed.

Component (A1) Polydimethylsiloxane/polycarbonate block copolymer.

1. 19.2 parts by weight of bisphenol A and 1,800 parts by weight of chlorobenzene are introduced into a vessel provided with a condenser, thermometer, dropping funnel and stirrer. The mixture is warmed to 100° C. and 11.6 parts by weight of potassium carbonate are added. Thereafter, a solution of 178 parts by weight of α,ω-bisacetoxypolydimethylsiloxane, $P_n=84$, in 178 parts by weight of chlorobenzene is added to the mixture under reflux over a period of 15 minutes, stirring being continued for a further two hours. The mixture is cooled to about 80° C. and filtered while still hot.

2. 3,035 parts by weght of bisphenol A, 3,024 parts by weight of sodium hydroxide, 34,700 parts by weight of water, 17,800 parts by weight of methylene chloride, 13,100 parts by weight of chlorobenzene and 164.7 parts by weight of 4-(1,1,3,3-tetramethylbutyl)-phenol are added to the solution, described under 1, of a polydimethylsiloxane with bisphenol A end groups in a reaction flask equipped with a stirrer, phosgene inlet tube, reflux condenser, internal thermometer and dropping funnel. 2,216 parts by weight of phosgene are passed in at room temperature, the pH being kept between 12 and 13 by addition of 45% strength sodium hydroxide solution. Introduction of the phosgene takes about one hour. Thereafter, 11 parts by weight of triethylamine are added and the mixture is subsequently stirred at pH 12 to 13 for a further 45 minutes. The cocondensate is worked up by methods customary for polycarbonate.

The siloxane content, that is to say the content of dimethylsiloxane units in % by weight, based on the total weight of the block copolymer, was determined by nuclear magnetic resonance spectrometry. The degree of polymerisation n obtained by determination of the end groups on the polysiloxane starting material is given as the average siloxane block length.

The relative solution viscosity was measured at 25° C. at a concentration of 5 g/l in methylene chloride.

The relative solution viscosity is 1,200; the siloxane content is 5.3% by weight.

Component (A2)

The preparation process for (A1) is repeated, with the difference that the amount of chain stopper, that is to say 4-(1,1,3,3-tetramethylbutyl)-phenol, is 125.5 parts by weight.

The relative solution viscosity, measured as for (A1), is 1,248; the siloxane content is 4.9% by weight.

Component (B1)

Graft polymer of 80% by weight of grafting base of crosslinked polybutadiene (gel content more than 70% by weight, measured in toluene) and 20% by weight of grating on material of methyl methacrylate, the average particle diameter of the grafting base, which is in latex form, being between 0.3 and 0.4 µm.

Component (B2)

Block copolymer of the styrene/ethylene/butylene/styrene type prepared from butadiene and styrene with subsequent hydrogenation; containing 24.5% by weight of styrene, 46.2% by weight of ethylene and 29.3% by weight of butylene and with a Brookfield viscosity of 2.0 Pa.s and a density of 0.92 g/cm$^3$. For Brookfield viscosity, see H. Elias, "Makromoleküle" ("Macromolecules"), page 229 et seq., 4th edition, Hüthig und Wepf Verlag, Basel and Heidelberg, 1981. (Kraton $^{(R)}$G 1651, commercial product from Shell).

Component (C)

Polybutylene terephthalate with an intrinsic viscosity of 1.25 dl/g, measured in phenol/o-dichlorobenzene 1:1) at 25° C.

The moulding compositions based on components (A), (B) and, if appropriate, (C) were prepared by melting and homogenisation on a suitable unit. The compositions were processed on an injection-moulding machine.

Instead of components (A1) or (A2), the following polycarbonates (A3) and (A4), without a siloxane content but with the same end groups, that is to say with 4-(1,1,3,3-tetramethylbutyl)-phenyl end groups, are employed in the comparison examples.

Polycarbonate (A3) is a bisphenol A homopolycarbonate with ηrel 1,200 (measured as described for (A1)), and prepared in a known manner in accordance with DE-OS (German Published Specification) No. 2,842,005.

Polycarbonate (A4) corresponds to polycarbonate (A3) but has a ηrel (measured as described for (A1)) of 1,250.

TABLE 1

|  | Dimension | Example 1 (comparison) | Example 2 (comparison) | Example 3 | Example 4 |
|---|---|---|---|---|---|
| Component A$_1$ | % | — | — | 53.9 | — |
| Component A$_2$ | % | — | — | — | 53.9 |
| Component A$_3$ | % | 53.9 | — | — | — |
| Component A$_4$ | % | — | 53.9 | — | — |
| Component B$_1$ | % | 10 | 10 | 10 | 10 |
| Component C | % | 36 | 36 | 36 | 36 |
| Heat stabiliser[1] | % | 0.1 | 0.1 | 0.1 | 0.1 |
| Melt viscosity at 260° C./10$^3$ s$^{-1}$ | Pa.s | 166 | 228 | 159 | 248 |
| Izod notched impact strength 2) (3.2 mm) |  |  |  |  |  |
| room temperature | J/m | 676* | 820* | 788* | 829* |
| 0° C. | " | 5 × 505*/5 × 251 | — | 666* | — |
| −10° C. | " | — | — | 570* | — |
| −20° C. | " | 187 | 593* | 268 | 668* |
| −30° C. | " | — | 306 | — | 602* |
| −40° C. | " | — | — | — | 324 |
| Critical temperature[3] | °C. | 0 | −20/−30 | −10/−20 | −30/−40 |
| Heat distortion point[2] | °C. | 110 | 115 | 109 | 115 |

*tough fracture
[1]tris(3-ethyl-oxetanyl-3-methyl) phosphite
[2]for the determination, see page 12
[3]tough/brittle transition at the corresponding test piece width

TABLE 2

|  | Dimension | Example 5 (comparison) | Example 6 |
|---|---|---|---|
| Component A$_2$ | % | — | 98 |
| Component A$_4$ | " | 98 | — |
| Component B$_2$ | " | 2 | 2 |
| Melt viscosity at 300° C./10$^3$ s$^{-1}$ | Pa.s | 198 | 215 |
| Izod notched impact strength [1] (3.2 mm) |  |  |  |
| room temperature | J/m | 745* | 823* |
| 0° C. | " | 718* | — |
| −10° C. | " | 6 × 689*/3 × 240 | — |
| −20° C. | " | 210 | — |
| −30° C. | " | 172 | — |
| −40° C. | " | 134 | 678* |
| critical temperature[2] | °C. | about −10 | <−40 |
| Izod notched impact strength[1] (6.4 mm) |  |  |  |
| room temperature | J/m | 8 × 627*/2 × 297 | 605* |

TABLE 2-continued

| | Dimension | Example 5 (comparison) | Example 6 |
|---|---|---|---|
| 0° C. | " | 194 | — |
| −10° C. | " | 160 | — |
| −20° C. | " | 144 | 528* |
| −30° C. | " | 132 | 2 × 373*/8 × 320 |
| −40° C. | " | 109 | 239 |
| critical temperature[2] | °C. | about room temperature | −30 |
| heat distortion point[1] | °C. | 147 | 146 |

*tough fracture
[1]for the determination, see page 12
[2]tough/brittle transition at the corresponding test piece width

CIP-Disclosure

With respect to the amount of added elastomeric polyemers with a glass transition temperature of less than −20° C. the preferred amount of 5 to 20 parts by weight relates to all elastomeric components (B) recited in this application except the optionally selectively hydrogenated block copolymers of a vinyl aromatic monomer X and a conjugated diene Y of the X-Y type or X(Y-X)r type (where r=1-5) or Y-(X)S type (where S=3-5). For these block copolymers the preferred amount is 1 to 3 parts by weight.

The complemenaary amounts of component (A) are 30 to 95 parts by weight respectively 47 to 99 parts by weight of component (A).

The preferred amounts of component (C) are 15 to 45 parts by weight.

We claim:

1. A thermolastic moulding composition containing
(A) 47 to 99 parts by weight of a polydiorganosiloxane/polycarbonate block copolymer having a weight average molecular weight of 10,000 to 30,000 determined in a known manner by ultracentrifugation or measurement of scattered light and with a content of poly(diorganosiloxane) structural units of between 10% by weight and 0.5% by weight, in each case based on the total weight of the blocked copolymer, the blocked copolymer having been prepared starting from polydiorganosiloxane(s) which contain $\alpha,\omega$-bis-hydroxyaryloxy end groups and having a degree of polymerization Pn of between 5 and 100, chain stopper also being used,
(B) 1 to 3 parts by weight of an elastomeric polymer having a glass transition temperature of less than −20° C. selected from optionally selectively hydrogenated blocked copolymers of a vinyl aromatic monomer X and a conjugated diene Y of the X-Y type or X(Y-X)$_r$ type wherein r is a whole number of 1 to 5, or Y(-X)$_s$ type wherein s is a whole number of 3 to 5, and
(C) 0 to 50 parts by weight of a thermoplastic polyalkylene terephthalate, the total of parts by weight of components A)+(B)+(C) in each case being 100 parts by weight, in which component (A) is prepared by the phase boundary process using a monoalkylphenol or dialkylphenol with a total of 8 to 20 carbon atoms in the alkyl substituents or a halogenocarbonic acid ester of such phenols, as the chain stopper.

2. The composition of claim 1 containing 15 to 45 parts by weight of component (C).

3. A moulding composition according to claim 1 in which component (A) has been prepared by the phase boundary process using a phenol of the formula (III) as the chain stopper

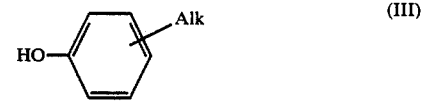

(III)

wherein Alk represents a linear or branched alkyl radical with 8 to 15 carbon atoms.

4. A moulding composition according to claim 1 in which component (A) additionally contains a siloxane-free thermoplastic polycarbonate having a monoalkylphenol or dialkylphenol with a total of 8 to 20 carbon atoms in the alkyl substituent or a halogeno-carbonic acid ester of such phenols, as a chain stopper.

5. A moulding composition according to claim 1, in which the polydiorganosiloxane/polycarbonate of component (A) has a content of poly(diorganosiloxane) structural units of between 7% by weight and 1% by weight in each case bssed on the total weight of block copolymer.

6. A moulding composition according to claim 1, in which the block copolymer of component (A) hss a degree of polymerisation P̄n of between 20 and 80.

7. A moulding composition according to claim 1, additionally containing up to 5% by weight, based on the total weight of components (A) and (B) and, if present, (C), of ethylene homopolymer or copolymer, the radicals of which consist of up to 30% by weight, in each case based on the ethylene copolymer, of radicals of other copolymerisable monomers.

8. A moulding composition according to claim 1 further comprising one or more additives selected from nucleating agents, stabilizers, reinforcing substances, or dyestuffs.

* * * * *